(12) United States Patent
Willenegger

(10) Patent No.: US 7,076,005 B2
(45) Date of Patent: Jul. 11, 2006

(54) SYSTEM AND METHOD FOR TRANSMISSION FORMAT DETECTION

(75) Inventor: Serge Willenegger, Onnens (CH)

(73) Assignee: Qualcomm, Incorporated, San Diego, CA (US)

( * ) Notice: Subject to any disclaimer, the term of this patent is extended or adjusted under 35 U.S.C. 154(b) by 894 days.

(21) Appl. No.: 09/785,809

(22) Filed: Feb. 15, 2001

(65) Prior Publication Data

US 2002/0141516 A1 Oct. 3, 2002

(51) Int. Cl.
*H03D 1/00* (2006.01)
*H04L 27/06* (2006.01)

(52) U.S. Cl. .................. 375/341; 375/340; 375/262; 375/225; 714/708

(58) Field of Classification Search .............. 375/341, 375/340, 259, 262, 225; 714/704, 795, 774, 714/788, 708; 370/465, 466
See application file for complete search history.

(56) References Cited

U.S. PATENT DOCUMENTS

| 5,509,020 | A | * | 4/1996 | Iwakiri et al. ............... 714/704 |
| 5,566,206 | A | | 10/1996 | Butler et al. |
| 5,751,725 | A | | 5/1998 | Chen |
| 5,878,098 | A | * | 3/1999 | Wang et al. ................. 375/377 |
| 6,108,372 | A | | 8/2000 | Tidemann, Jr. |
| 6,112,325 | A | * | 8/2000 | Burshtein .................... 714/774 |
| 6,175,590 | B1 | * | 1/2001 | Stein .......................... 375/225 |
| 6,205,130 | B1 | * | 3/2001 | DeJaco ........................ 370/335 |
| 6,393,074 | B1 | * | 5/2002 | Mandyam et al. .......... 375/341 |
| 6,560,744 | B1 | * | 5/2003 | Burshtein .................... 714/774 |

FOREIGN PATENT DOCUMENTS

EP 0920160 A2 6/1999

OTHER PUBLICATIONS

ETSI–RAN: "Universal Mobile Telecommunications System (UMTS); Multiplexing and channel coding (FDD)" 3GPP TS 25.212 V3.5.0 REL 1999, Dec. 2000, pp. 1–63.

* cited by examiner

*Primary Examiner*—Phuong Phu
(74) *Attorney, Agent, or Firm*—Philip R. Wadsworth; Thien T. Nguyen; S. Hossain Beladi

(57) ABSTRACT

A system and method for detecting a correct transmission format upon encountering a decoding error in a variable-format transmission scheme, wherein the decoding error results from an unsuccessful decoding of a frame. The invention provides for prioritizing the permissible formats, resulting in a prioritized order. The frame data is then decoded according to one or more of the permissible formats in the prioritized order, and if the decoding is successful in accordance with one of the formats, that format is selected as the correct transmission format.

27 Claims, 4 Drawing Sheets

100A

100B

SYSTEM AND METHOD FOR TRANSMISSION FORMAT DETECTION

BACKGROUND

1. Field

The present invention relates generally to communications, and more specifically to transmission format detection in a variable-format transmission scheme.

2. Background

Traditionally, communication systems provided voice service but little else. Voice data was broken into small pieces and coded according to a single format for transmission. Today's communication systems offer a variety of services which vary dramatically in their requirements, such as quality of service requirements, delay requirements, error or rate requirements, and data rate requirements. This places a significant burden on the communication system to provide many different transmission formats to accommodate these services in an efficient manner. Further, a single communication can include two or more of these transmission formats simultaneously. For example, a single call can include audio, video, and data (such as text characters or graphical information). These types of data have different tolerances to delay and varying requirements in terms of quality of service. So each may be encoded differently with different size and different protection schemes.

Today, many second-generation and third-generation mobile communication systems employ multiple transmission format schemes to meet the needs of varied services. These schemes are used to transmit information in the form of digital data, where the data is alternatively encoded according to two or more transmission formats and sent over a communications link. Transmission formats can vary according to type of data (e.g., video, audio, data), modulation, transmission rate (often referred to as variable rate transmission schemes), error protection schemes, or transmission payload sizes. For example, the mobile systems specified in the Telecommunications Industry Association/Electronics Industry Association-95 (TIA/EIA-95) and the 3rd Generation Partnership Project—Universal Mobile Telecommunications System (3GPP-UMTS) standards employ multiple transmission format schemes. These schemes will be referred to herein collectively as variable-format transmission schemes.

Receivers used in a variable-format transmission scheme detect the actual transmission format used by the transmitter. Format detection can be explicit or implicit. In implicit detection schemes, the transmitter does not provide any information to the receiver identifying the transmission format used by the transmitter during the encoding process. Implicit schemes commonly employ a trial and error approach wherein the receiver tries to decode the data according to permissible formats until the data is correctly decoded. Successful decoding can be verified, for example, by appending a cyclic (or cyclical) redundancy code (CRC) to the data block. If the CRC "checks" it is very likely that the data is correct. If the CRC does not check, the data block either contains one or more bit errors or has been decoded with an incorrect transmission format assumption.

In explicit detection schemes, the transmitter provides the receiver with information, referred to herein as side information, that identifies the particular transmission format used in the encoding process. The receiver decodes the received information assuming that the transmission format is the one indicated by the transmitter. As with implicit detection, the receiver can verify that the data is correctly decoded if a CRC is appended by the transmitter.

Transmissions are broken into transmission intervals referred to herein as frames. Some systems use fixed-length frames, whereas other systems provide for variable-length frames (as used herein, the term "frame" refers to both fixed and variable length intervals). Systems using explicit detection transmit frames that include data and a format indication that identifies the transmission format that was used to encode the data.

For example, Universal Mobile Telephone System (UMTS) as defined by the $3^{rd}$ Generation Partnership Project (3GPP) employs a variable-format transmission scheme using explicit format detection. The set of UMTS specification documents defines a system for broadband, wireless, packet-based transmission of text, digitized voice, video, and multimedia at data rates up to and possibly higher than two megabits per second (Mbps).

Transmission formats in UMTS are denominated transport formats (TF) (these terms are used interchangeably herein). A single UMTS communication link can support different transport channels, or sub-channels, that can be multiplexed both in time and in code. Different services are mapped to different sub-channels. For example, audio may be mapped to sub-channel 1 and video to sub-channel 2. Each sub-channel supports a set of transport formats referred to herein as transport format sets (TFS). A TFS can contain several transport formats. Certain combinations of transport formats are allowed by the service, others are not.

In UMTS, each frame may be encoded using a combination of transport formats, one for each sub-channel, called the transport format combination (TFC). The subset of all permissible combinations that are allowed in any frame is called the transport format combination set (TFCS). A transport format combination indicator (TFCI) is associated with each TFC. The transmitter multiplexes (using time multiplexing) the TFCI within the frame. The receiver extracts the TFCI bits, decodes the TFCI, and then decodes the frame data according to the TFC associated with the decoded TFCI.

Interim Standard 95 (IS-95) is another variable-format transmission scheme. IS-95 is a CDMA-based technology wherein a single service (voice) is efficiently encoded using four different transmission formats. For example, periods of active speech are encoded using a full-rate transmission format, whereas periods of silence are encoded using a ⅛-rate transmission format. Periods such as the beginning or end of a sentence or between words are encoded using a ¼- or ½-rate transmission format.

A received frame may contain errors in the format indication and/or data resulting from noise and interference. Radio communication links are particularly likely to introduce such errors. Robust coding schemes are commonly applied to both the data and the format indication so that errors can be corrected. However, it is always possible that errors will remain in the decoded frame due to particularly bad channel conditions. Corrupted bits in either the format indication or in the data itself will cause an error to occur in the receiver during the decoding process. This is because in the former case, the receiver attempts to decode the frame data using a format different from the format used in the encoding process. In the latter case, the receiver attempts to decode the data using the proper format, but nevertheless fails because the data is corrupted.

The receiver cannot successfully decode data when the data itself is corrupted. In this case, the receiver can only inform the upper application layers that an error occurred so that the data can be retransmitted. However, if the format indication is corrupted, the receiver may still have received uncorrupted data which can be successfully decoded once the correct transport is detected. The receiver therefore must determine which transmission format was actually used to encode the frame data. The problem is further complicated by the fact that the receiver may not know whether a decoding error is due to corruption of the data, corruption of the format indication, or both.

There is therefore a need in the art for an efficient method for detecting the correct transmission format in a variable-format transmission scheme upon encountering a decoding error, so that uncorrupted data may still be successfully decoded.

SUMMARY

Embodiments disclosed herein address the above stated needs by selecting the correct transmission format from two or more permissible transmission formats, wherein the permissible transmission formats are successively applied to the frame data in a prioritized order. The correct transmission format is detected upon successful decoding of the frame data. According to the present invention, the permissible transmission formats can be prioritized using different criteria.

According to the present invention, a correct transmission format is detected upon encountering a decoding error in a variable-format transmission scheme, wherein the decoding error results from an unsuccessful decoding of a frame. The invention provides for prioritizing the permissible formats, resulting in a prioritized order. The frame data is then decoded according to one or more of the permissible formats in the prioritized order, and if the decoding is successful in accordance with one of the formats, that format is selected as the correct transmission format.

According to a first aspect of the present invention, the prioritization can be accomplished by determining a metric for each permissible format, and then ordering the formats according to the metrics. Different metrics can be used to accomplish this prioritization. For example, the metric for each permissible format can be a function of the format indication corresponding to the permissible format and the corrupted format indication that caused the original decoding error. This example metric prioritizes the permissible formats according to the similarity between these format indications; permissible formats having an indication more similar to the corrupted format indication are given higher priority. As another example, the metric for each permissible format can be a function of the formats associated with previously received frames that were successfully decoded. This historical format data can indicate a higher priority for certain permissible formats, such as when a particular format has been frequently received in the past, or when a particular format was successfully used to decode other frames in the same block of data.

DETAILED DESCRIPTION

Overview

Figure 1A:
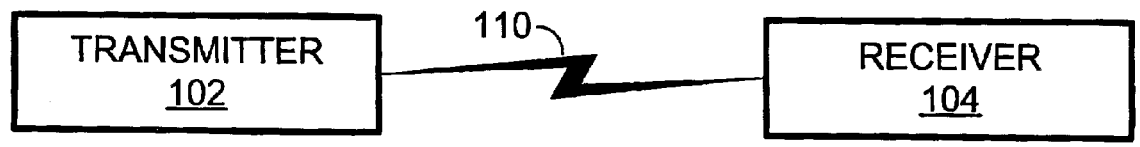
FIG. 1A depicts an example communications environment within which the present invention operates.

The present invention relates generally to the detection of a correct transmission format in a variable-format transmission scheme. FIG. 1A depicts an example communications environment 100A within which the present invention can operate. Example communications environment 100A includes a transmitter 102 in communication with a receiver 104 via a communication link 110. Transmitter 102 can represent any device capable of transmitting information over communication link 110. Similarly, receiver 104 can represent any device capable of receiving information over communication link 110. Communication link 110 can represent any communication media via which information can flow, including, but not limited to, wireless communication links such as a mobile radio link. Information is communicated via communication link 110 according to a variable-format transmission system.

Figure 1B:
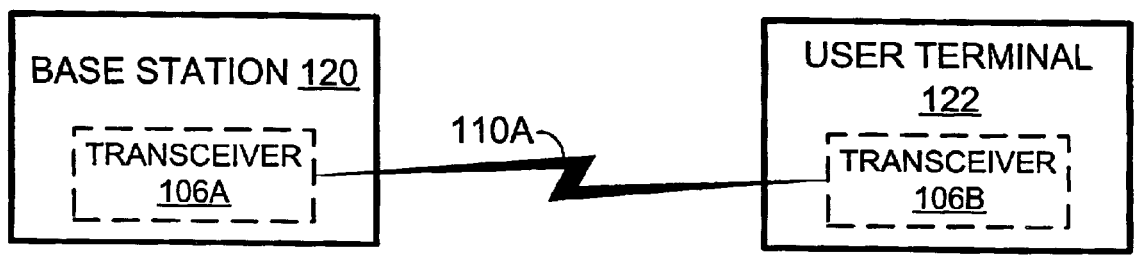
FIG. 1B depicts a mobile communication environment that includes a base station in communication with a user terminal via a radio communication link.

Receiver 104 may be configured for transmission format detection according to the present invention. As will be apparent, receivers so configured may find application in many different environments. For example, FIG. 1B depicts a mobile communication environment 100B that includes a base station 120 in communication with a user terminal 122 via a radio communication link 110A. Base station 120 and user terminal 122 both include a transceiver 106 (shown as 106A in base station 120, and 106B in user terminal 122) for full-duplex communication, wherein transceiver 106 includes both transmitter and receiver sections. Both transceivers 106 may therefore be configured in relevant part as described with respect to receiver 104.

Receiver 104 may be configured to perform the operations described herein in hardware, software, or a combination of both. These operations are described herein and illustrated in the appended flowcharts. It will be apparent to those of skill in the art that many of these operations can be interchanged without departing from the scope of the invention. It will also be apparent that there could be many different ways of implementing the invention in computer programming, whether software or a combination of hardware and software, and the invention should not be construed as limited to any one set of computer program instructions. Further, a skilled programmer would be able to write one or more computer programs to implement the disclosed invention without difficulty based on the flowcharts and associated written description included herein. Therefore, disclosure of a particular set of program code instructions is not considered necessary for an adequate understanding of how to make and use the invention. The inventive functionality of the claimed computer programs and/or hardware devices will be explained in more detail in the following description in conjunction with the remaining figures illustrating the program flow.

Figure 2:
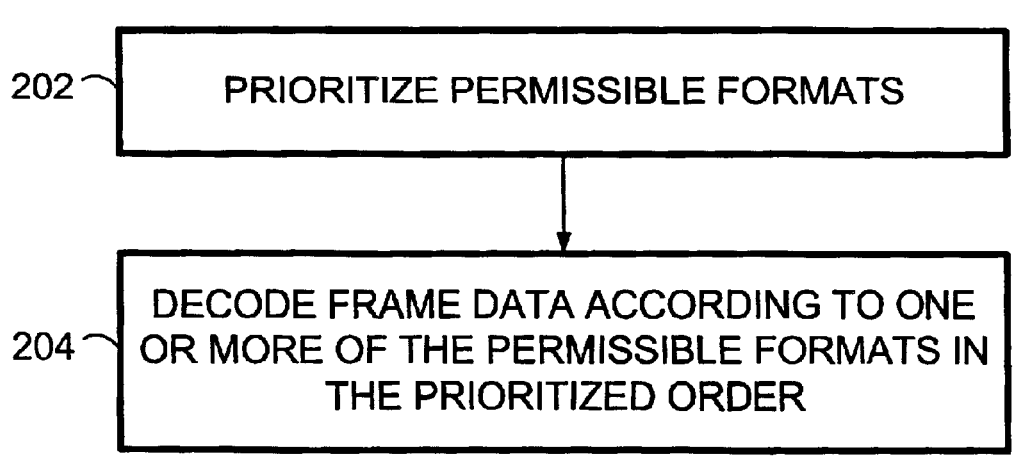
FIG. 2 is a flowchart that describes a method according to an example embodiment of the present invention for detecting a correct transmission format in a variable-format transmission scheme.

FIG. 2 is a flowchart 200 that describes a method according to an example embodiment of the present invention for detecting a correct transmission format in a variable-format transmission scheme. The operations described in flowchart 200 might, for example, be triggered upon encountering an error resulting from an unsuccessful decoding of a frame. Such an error can result from the corruption of the format indication or data associated with the frame, such as noise or interference encountered during transmission over communication link 110.

In operation 202, a plurality of permissible formats associated with the received frame are prioritized, resulting in a prioritized order. In operation 204, the frame data is decoded according to one or more of the permissible formats, where the permissible formats are applied to the data in the prioritized order. The permissible format that results in the successful decoding of the data is selected as the correct transmission format.

Each of these operations is described in further detail in the following section. This is followed by a description of several example criteria for prioritizing transmission formats according to the present invention. As will also be apparent to those of skill in the art, the operations can be incorporated within any receiver 104 (or transceiver 106) in a variable-format transmission system, such as UMTS and IS-95. Receiver 104 may be implemented at many different points in the system, such as within user terminal 122, or within base station 120.

Method for Detecting a Correct Transmission Format

Returning to FIG. 2, each of the operations shown in flowchart 200 is now described in greater detail. In operation 202, a plurality of permissible formats is prioritized, resulting in a prioritized order of the formats. The prioritized order reflects the probability that the permissible formats were used to encode to received frame, in order from most probable to least probable. The set of permissible formats includes those transmission formats (or transmission format combinations, such as a TFC in UMTS) that could have been used to encode the received frame. The set of permissible formats for a given frame is often defined by the transmission system. For example, in UMTS, the TFS defines the subset of all permissible transport formats that are allowed in a particular sub-channel. The received frame includes a format indication that identifies a transmission format. However, decoding the frame data according to this format resulted in the error that triggered the format detection operations. This transmission format will be referred to herein as the received transmission format, and the corresponding received format indication. According to an example embodiment of the present invention, the received transmission format is not included within the prioritized order, since it has already been demonstrated that this format does not result in a successful decoding.

Figure 3:
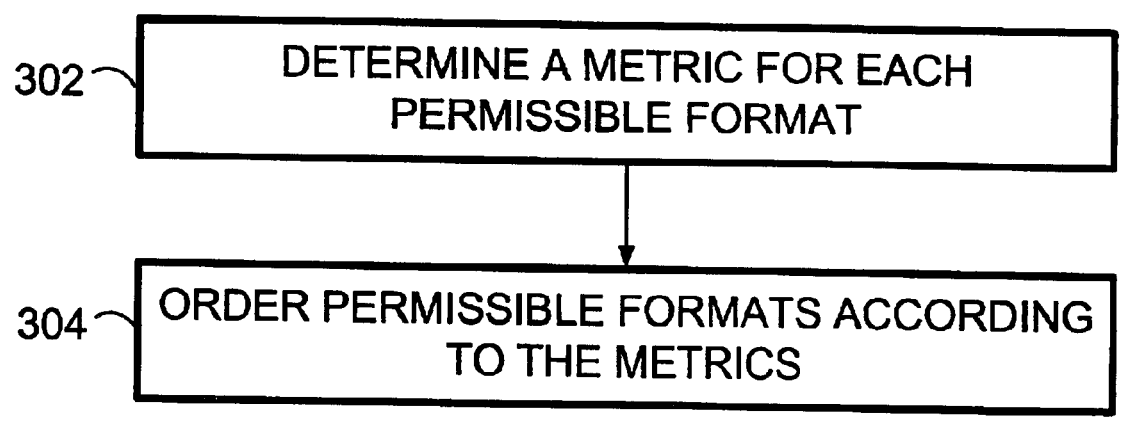
FIG. 3 is a flowchart that describes the prioritization operation in greater detail according to an example embodiment of the present invention.

FIG. 3 is a flowchart that depicts the prioritization operation 202 in greater detail according to an example embodiment of the present invention. In operation 302, a metric is determined for each of the plurality of permissible formats. The metric corresponding to a permissible format reflects the probability, measured according to the present invention, that the permissible format is the transmission format that was used to encode the received frame. Following sections describe several alternative embodiments of the metric according to the present invention.

In operation 304, the permissible formats are ordered according to the metrics, such that the order reflects the relative probability that each permissible format is the correct transmission format, from most probable to least probable. According to an example embodiment, the metrics are expressed as a floating point number, where larger numbers indicate a higher probability. In this example embodiment, operation 304 is accomplished by a simple sort of the metrics, from highest to lowest.

Figure 4:
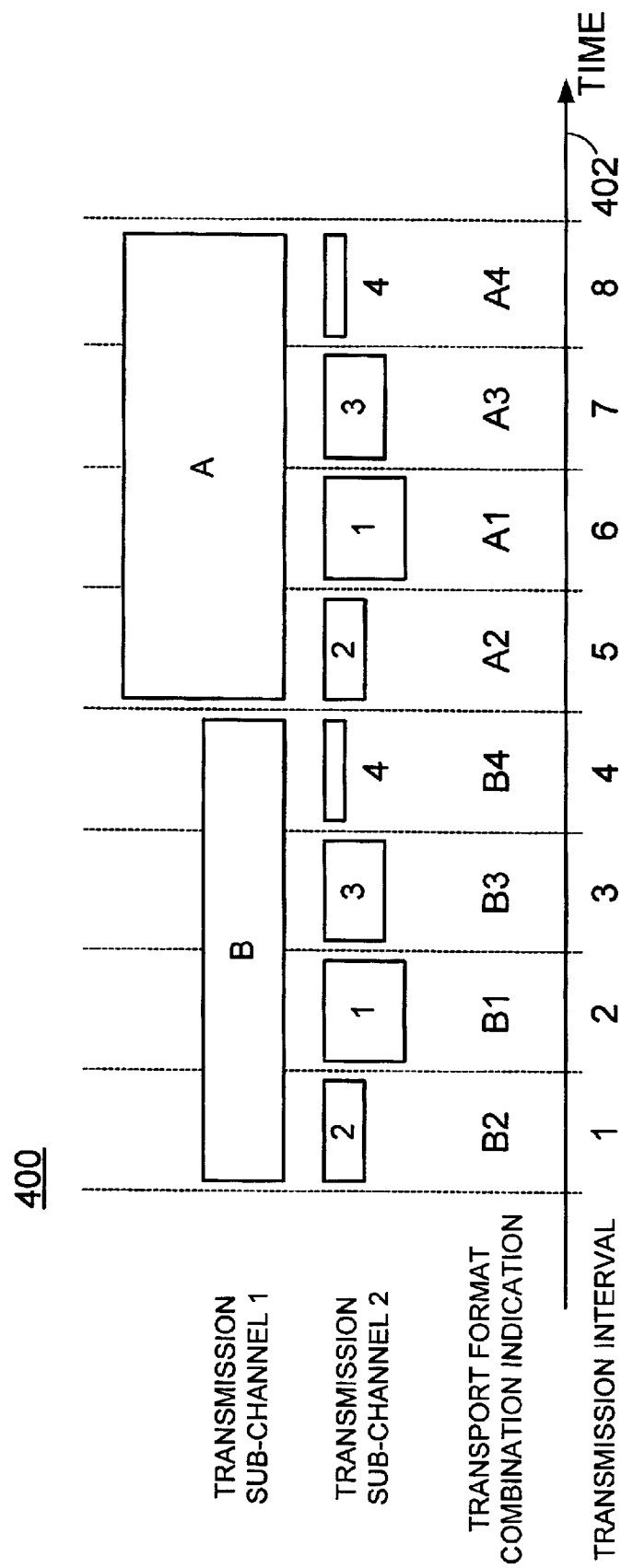
FIG. 4 is a diagram depicting an example sequence of frames that includes data from two transmission subchannels encoded according to a variable-format transmission scheme.

FIG. 4 is a diagram 400 that depicts an example sequence of frames. The horizontal axis represents a time axis 402 broken into eight transmission intervals. The data from two sub-channels (shown as transmission sub-channels 1 and 2) over each transmission interval is encoded as a frame, along with a TFCI that identifies the particular combination format used to encode the frame. The different formats used in transmission sub-channels 1 and 2 are depicted as boxes of varying shape. In the example shown in FIG. 4, two transmission formats (shown as formats A and B) are depicted with respect to transmission sub-channel 1. Similarly, four transmission formats (shown as formats 1, 2, 3, and 4) are depicted with respect to transmission sub-channel 2. For example, during time interval 1 data from transmission sub-channel 1 is encoded according to transmission format B, whereas data from transmission sub-channel 2 is encoded according to transmission format 2. The encoded data from both sub-channels is combined to form the frame for time interval 1, along with a TFCI of B2 identifying the combination format. The example depicted in FIG. 4 will be referenced throughout the remainder of this description to illustrate various facets of the present invention.

Relating operation 302 to the example of FIG. 4, assume that transmission sub-channel 2 can employ four permissible transmission formats: 1, 2, 3, and 4. As shown in FIG. 4, the frame data from transmission sub-channel 2 is encoded using format 1 during transmission interval 2. However, assume that the transport format combination indication is corrupted as a result of the frame being transmitted via communication link 110, with a TFCI of B3 being received rather than B1. Receiver 104 will not be able to successfully decode sub-channel 2 data during this time interval using format 3 because it was encoded using format 1. In operation 302, metrics are therefore determined for permissible formats 1, 2, and 4. If the metrics accurately reflect the probability of the permissible format being the correct format, the metric corresponding to format 1 should indicate a greater probability than the metrics corresponding to formats 2 and 4. Note that the set of permissible formats may not include format 3, even though format 3 is a valid transmission format for sub-channel 2, since receiver 104 tried to decode sub-channel 2 data using format 3 and failed.

Returning to FIG. 2, in operation 204 the frame data is decoded according to one or more of the permissible formats, where the permissible formats are applied to the data in the prioritized order. The permissible format that results in the successful decoding of the frame data is selected to be the correct format. Applying the permissible formats in the prioritized order insures that the formats considered to be the most probable are applied first, thereby on average reducing the processing required to detect a correct format.

As will be apparent to those of skill in the art, the frame data need not be completely decoded in operation 204 in order to make a determination as to whether a permissible format is the correct transmission format. Rather, in many instances only a partial decoding of frame data is necessary to reach this determination. Example techniques for such a partial decoding are described in U.S. Pat. No. 6,108,372, entitled "Method and apparatus for decoding variable rate data using hypothesis testing to determine data rate", U.S. Pat. No. 5,751,725, entitled "Method and apparatus for determining the rate of received data in a variable rate communication system", and U.S. Pat. No. 5,566,206, entitled "Method and apparatus for determining data rate of transmitted variable rate data in a communications receiver," all of which are incorporated herein by reference. According to an example embodiment, operation 204 proceeds only as long as is necessary to determine whether the permissible format is correct. The decoding process is terminated upon reaching a determination that the permissible format is not the correct format. Operation then proceeds on to the next permissible format (assuming that additional permissible formats remain in the prioritized order). However, the frame data is completely decoded if it is determined that the permissible format is the correct format.

Referring to the example discussed above with respect to FIG. 4, assume that the following metrics were calculated in operation 204: 5.4 for format 1, 1.3 for format 2, and 2.1 for format 4. The permissible formats would therefore be prioritized in the following order: 1, 4, 2. In operation 204, an attempt would be made to decode the data according to the highest priority format, which in this case is format 1. Assuming that the frame data is not corrupted, this will result in a successful decoding and format 1 is properly selected as the correct format.

As will be apparent, if the frame data is corrupted operation 204 will not result in a correct decoding even if all permissible formats are tried. According to an example embodiment, receiver 104 in this situation informs the upper application layers that faulty data has been received. In some systems, the frame would be re-transmitted by transmitter 102.

According to an example embodiment of the present invention, the processing resources required by operation 204 can be reduced by attempting to decode the frame data using only those permissible formats having a metric exceeding a threshold. By applying this threshold, processing resources are not expended testing those transmission formats deemed not to be sufficiently likely to be the correct format. This can result in a significant savings where the metrics indicate that one or more permissible formats are unlikely to be the correct transmission format. If none of the permissible formats having a metric exceeding the threshold result in a successful decoding, it is assumed that the data has been corrupted and the upper application layers are notified accordingly.

The following sections describe example embodiments of the present invention employing various metrics for prioritizing permissible formats. Metrics that are a function of format indications are first described, followed by metrics that are based on historical format data. Two or more of these metrics can also be combined so that the prioritization of permissible formats reflects multiple criteria for determining the probability that a permissible format is the correct format.

Metrics Based on Format Indications

According to the present invention, metrics can be calculated as a function of the format indications corresponding to the permissible formats, and corresponding to the received transmission format. More specifically, metrics can be a function of the code words representing these format indications.

As a first example embodiment, the metric for a particular permissible format is defined as the Euclidean distance between the format indication corresponding to the particular permissible format and the received format indication corresponding to the received transmission format. The Euclidean distance can be calculated, for example, as the distance between the code words representing these two format indications. This example metric is premised upon the assumption that corruption of the transmitted format indication will result in a received format indication that is similar to the transmitted format indication. Therefore, those format indications deemed to be similar to the received format indication are considered more likely candidates to be the transmitted (i.e., correct) format indication. In this example embodiment, similarity is measured as a Euclidean distance between the code words.

Consider the following example with reference to FIG. 4 using a metric based on Euclidean distance. Assume that the following set of code words identifies the four formats of transmission sub-channel 2:

$$F = \begin{bmatrix} \vec{f}_1 \\ \vec{f}_2 \\ \vec{f}_3 \\ \vec{f}_4 \end{bmatrix} = \begin{bmatrix} 1 & 1 & 1 & 1 & 1 & 1 & 1 & 1 \\ 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{bmatrix}$$

For example, the code word representing the format indication corresponding to format 1 is given by [1 1 1 1 1 1 1 1], the code word for format 2 is given by [1 1 1 1 0 0 0 0], the code word for format 3 is [1 1 0 0 1 1 0 0], and the code word for format 4 is [1 0 1 0 1 0 1 0]. Again considering transmission interval 2, sub-channel 2 data is encoded according to format 1.

However, assume that the transmitted format indication is corrupted, with the received format indication given by the code word:

$$\vec{r}_x = [1\ 1\ 1\ 0\ 1\ 1\ 0\ 0.5]$$

Receiver 104 uses the Euclidean distance between the received code word and the set of possible code words to decide which code word was transmitted, and consequently which transmission format was used to encode the frame. A set of difference vector can be defined as:

$$D = F - \vec{r}_x = \begin{bmatrix} \vec{f}_1 - \vec{r}_x \\ \vec{f}_2 - \vec{r}_x \\ \vec{f}_3 - \vec{r}_x \\ \vec{f}_4 - \vec{r}_x \end{bmatrix} = \begin{bmatrix} 0 & 0 & 0 & 1 & 0 & 0 & 1 & 0.5 \\ 0 & 0 & 0 & 1 & -1 & -1 & 0 & -0.5 \\ 0 & 0 & -1 & 0 & 0 & 0 & 0 & -0.5 \\ 0 & -1 & 0 & 0 & 0 & -1 & 1 & -0.5 \end{bmatrix}$$

The norm of the difference vectors can be computed which corresponds to the distance between the received code word and the four possible code words, given by:

$$\vec{d} = diag(D \times D^T) = \begin{bmatrix} 2.25 \\ 3.25 \\ 1.25 \\ 3.25 \end{bmatrix}$$

Since this measure of similarity is computed as a distance between two code words, smaller distances indicate greater similarity. As shown, the received code word is most similar to the code word corresponding to format 3, followed by format 1, and formats 2 and 4 (tied). Receiver 102 may use this calculation to mistakenly decode the received format indication as indicating format 3. However, because the frame was encoded according to format 1, the decoding will fail.

According to this example embodiment of the present invention, metrics are determined for permissible formats 1, 2, and 4 using the Euclidean distance calculated above. As shown, the metrics are as follows: permissible format 1 is 2.25, permissible format 2 is 3.25, and permissible format 4 is 3.25. The permissible formats are therefore prioritized in the following order: 1, 2, 4 (or 1, 4, 2, depending upon how ties are resolved). Decoding the data according to format 1 will result in a successful decoding, thereby correctly selecting transmission format 1.

According to a second example embodiment of the present invention, in a system employing bi-orthogonal encoding of format indications, metrics are calculated as the projection of a received code word onto a Hadamard space made up of the code word vectors corresponding to the set of permissible formats. The projection represents a measure of the similarity between the received code word and each of the code word vectors. Here, the magnitude of the projection is reflective of the similarity. The permissible formats are therefore prioritized according to the magnitude of the projection, from greatest to least.

Consider the following example. Transmitter 102 employs bi-orthogonal (8,4) encoding to transform 4 information bits into 8 transmitted bits, where the 4 information bits represent a format indication capable of identifying up to 16 different formats. An example encoding matrix may be defined as:

$$E_{8,4} = \begin{bmatrix} 1 & 1 & 1 & 1 & 1 & 1 & 1 & 1 \\ 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{bmatrix}$$

Further assume that the following information bits represent the transmitted format indication:

$$\vec{d} = [0\ 1\ 1\ 0]$$

which identifies transport format 7. The bi-orthogonal encoding process can be described as:

$$\vec{s} = \vec{d} \cdot E_{8,4} = [0\ 1\ 1\ 0] \cdot \begin{bmatrix} 1 & 1 & 1 & 1 & 1 & 1 & 1 & 1 \\ 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{bmatrix} = [0\ 0\ 1\ 1\ 1\ 1\ 0\ 0]$$

where the vector [0 0 1 1 1 1 0 0] represents the encoded format indication that is transmitted by transmitter 104 using, for example, binary phase shift keyed (BPSK) modulation where 0 is mapped to −1 and 1 is mapped to +1.

Receiver 106 receives a noisy vector given by:

$$\vec{r} = [-1\ 0\ +1\ 0\ +1\ 0\ -1\ 0.5]$$

An inverse Hadamard transform is performed on the received vector which projects the vector onto the code word vectors forming the Hadamard space. This inverse transform can be described as:

$$\vec{w} = \vec{r} \cdot H_8 = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \cdot \begin{bmatrix} -1 \\ 0 \\ +1 \\ 0 \\ +1 \\ 0 \\ -1 \\ 0.5 \end{bmatrix} = \begin{bmatrix} 0.5 \\ -0.5 \\ -0.5 \\ 0.5 \\ -0.5 \\ 0.5 \\ -3.5 \\ -4.5 \end{bmatrix}$$

As shown, the received code word is most similar to the code word corresponding to format 8, followed by formats 7 and the others. Receiver 102 may use this calculation to mistakenly decode the received format indication as indicating format 8. However, because the frame was encoded according to format 7, the decoding will fail.

According to this example embodiment of the present invention, metrics are determined for permissible formats 1 through 7 using the bi-orthogonal projection calculated above. As shown, the metric are as follows: permissible formats 1, 4, and 6 are 2.25; permissible format 2, 3, and 5 are −0.5; and permissible format 7 is −3.5. The permissible formats are therefore prioritized in the following order (in order of decreasing magnitude): 7, and a six-way tie between permissible formats 1 through 6. Decoding the data according to format 7 will result in a successful decoding, thereby correctly selecting transmission format 7.

Metrics Based on Historical Format Data

According to the present invention, metrics can also be a function of historical format data. More specifically, metrics can be determined based on the formats associated with previously received frames that were successfully decoded. Various types of historical format data can be used to determine metrics for prioritizing permissible formats. Alternatively, historical format data can be used in combination with other metrics, such as the metrics described above based on format indications, to achieve a prioritization that reflects multiple criteria.

According to a first example embodiment, metrics for prioritizing the permissible formats are determined by tracking the occurrences of the permissible formats over a defined interval of time. The metric for each permissible format reflects the number of occurrences of that permissible format relative to the number of occurrences of the other permissible formats. This metric is premised upon the assumption that those formats which more frequently occur over the time interval are more likely to re-occur during the current frame. As a first example, assume that over the last 1,000 frames, format 1 was used to encode 345 frames (i.e., 345 occurrences), format 2 had 542 occurrences, format 3 had 102 occurrences, and format 4 had 11 occurrences. According to this example embodiment, the metrics could be calculated as 0.345 for format 1, 0.542 for format 2, 0.102 for format 3, and 0.011 for format 4, resulting in a prioritized order of formats 2, 1, 3, 4. As will be apparent, these metrics can be scaled by an arbitrary factor and still achieve the same result. Further, the time interval over which historical format data is collected can be adjusted to best fit a particular application, by, for example, lengthening or shortening the window length, or shifting the window forward in time to include future frames as well as past frames.

According to a second example embodiment, the metrics used for prioritizing permissible formats may be based, at least in part, on the occurrence of permissible formats successfully decoded in other frames corresponding to a single block of data. Referring to the example shown in FIG.

4, a multi-frame block of data encoded using format B is sent via transmission sub-channel 1 during time intervals 1 through 4. Assume that upon receiving the fourth frame in the block (time interval 4), receiver 104 decodes the format indication as C rather than B due to a noisy communication link 110. According to this example embodiment, the metrics at least partially reflect the fact that three previous frames in the same data block were correctly decoded using format B for the data in sub-channel 1. The metric corresponding to format B is adjusted to reflect the high probability that the last frame in the data block was also encoded using format B.

According to a third example embodiment, metric values may be further adjusted to reflect co-channel information. Consider the situation where data is encoded from multiple sub-channels, and where a data block in one sub-channel extends over multiple frames. In the UMTS context, successful decoding in other sub-channels using the TFCI can further increase confidence that the format used to encode previous frames in the data block was used to encode the current frame. Referring again to the example shown in FIG. 4, assume that the frames were received and correctly decoded during time intervals 1 through 3. The TFCI over these time intervals was B2, B1, and B3. Using these TFCIs, data was correctly decoded from sub-channel 2 according to formats 2, 1, and 3, respectively. This fact increases the probability that the TFCI was correctly decoded with respect to the format indication for sub-channel 1 over these same frames, namely format B. The metric for permissible format B should therefore be adjusted to reflect an increased confidence.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting a correct transmission format upon encountering a decoding error in a variable-format transmission scheme, wherein the decoding error results from an unsuccessful decoding of a frame including data, comprising:

prioritizing a plurality of permissible formats, resulting in a prioritized order; and decoding the data according to one or more of said permissible formats in said prioritized order, and if said decoding according to one of said permissible formats is successful, selecting the corresponding permissible format as the correct transmission format;

wherein said prioritizing comprises:

determining a metric for each of said plurality of permissible formats; and ordering said permissible formats according to said metrics to form said prioritized order;

wherein the frame further includes a format indication corresponding to a first format, wherein a permissible format indication corresponds to each of said plurality of permissible formats, and wherein said metrics are a function of the indication and the corresponding permissible format indication.

2. The method of claim 1, wherein said function comprises a Euclidean distance between a first code word associated with said format indication and a second code word corresponding permissible format indication.

3. The method of claim 1, wherein said function comprises a projection of a first code word representing said format indication onto a Hadamard space, wherein said Hadamard space includes code word vectors representing said plurality of permissible format indications.

4. The method of claim 1, wherein the frame further includes a format indication corresponding to a first format, wherein said metrics are a function of historical format data.

5. The method of claim 4, wherein said historical format data comprises the number of occurrences of said permissible formats during a first time interval.

6. The method of claim 1, wherein said determining a metric comprises:
   tracking a number of occurrences corresponding to each of said permissible formats over a first time interval; and
   calculating said metrics using said number of occurrences of the corresponding permissible format.

7. The method of claim 6, wherein said first time interval ends prior to the unsuccessful decoding of the frame.

8. The method of claim 1, wherein the frame is one of a plurality of frames transmitting a block of data, wherein each of said metrics is at least a function of the number of occurrences of the corresponding permissible format over said block of data.

9. The method of claim 8, wherein the frame includes a plurality of sub-channels, wherein a transport format combination indicator is associated with each of said plurality of frames, and wherein each of said metrics is further a function of said transport format combination indicators.

10. The method of claim 1, wherein said decoding comprises decoding the data according to each of said permissible formats in said prioritized order until the data is correctly decoded, or until said permissible formats have been exhausted.

11. The method of claim 10, wherein only those permissible formats having a metric within a first range are included in said prioritized order.

12. The method of claim 1, wherein said decoding comprises partially decoding the data until it can be determined whether said decoding is successful.

13. A method for decoding data upon encountering a transmission error in a variable-format transmission scheme, wherein the error results from an unsuccessful decoding of a frame including data, comprising:
   determining a metric for each of a plurality of permissible formats;
   prioritizing said permissible formats according to said metrics, resulting in a prioritized order; and
   decoding the data according to one or more of said permissible formats in said prioritized order; wherein the frame further includes a format indication corresponding to a first format, wherein a permissible format indication corresponds to each of said plurality of permissible formats, and wherein said metrics are a function of the format indication and the corresponding permissible format indication.

14. The method of claim 13, wherein said decoding comprises decoding the data according to each of said permissible formats in said prioritized order until the data is correctly decoded, or until said permissible formats have been exhausted.

15. The method of claim 14, wherein said decoding further comprises reporting an error to an upper application layer upon exhausting said permissible formats.

16. A remote station apparatus comprising:
   means for receiving a frame, wherein said frame includes data;
   means for determining a metric for each of a plurality of permissible formats upon the unsuccessful decoding of said frame; and
   means for decoding said data according to one or more of said permissible formats in order of said metrics, and if said decoding is successful, for selecting the corresponding permissible format as the correct transmission format;
   wherein said frame further includes a received format indication, wherein a permissible format indication corresponds to each of said plurality of permissible formats, and wherein said means for determining comprises means for calculating the Euclidean distance between the code words representing said received format indication and said permissible format indications.

17. The apparatus of claim 16, wherein said frame further includes a received format indication, wherein a permissible format indication corresponds to each of said plurality of permissible formats, and wherein said means for determining comprises means for projecting a first code word representing said received format indication onto a Hadamard space, wherein said Hadamard space includes code word vectors representing said plurality of permissible format indications.

18. The apparatus of claim 16, wherein said means for determining comprises:
   means for tracking a number of occurrences corresponding to each of said permissible formats over a first time interval; and
   means for calculating said metrics using said number of occurrences of the corresponding permissible format.

19. A computer readable media embodying a method for detecting a correct transmission format upon encountering a decoding error in a variable-format transmission scheme, wherein the decoding error results from an unsuccessful decoding of a frame including data, the method comprising:
   determining a metric for each of a plurality of permissible formats;
   prioritizing said permissible formats according to said metrics, resulting in a prioritized order; and
   decoding the data according to one or more of said permissible formats in said prioritized order, and if said decoding is successful, selecting the corresponding permissible format as the correct transmission format;
   wherein the frame further includes a format indication corresponding to a first format, wherein a permissible format indication corresponds to each of said plurality of permissible formats, and wherein said metrics are a function of the format indication and the corresponding permissible format indication.

20. The computer readable media of claim 19, wherein said function comprises a Euclidean distance between a first code word associated with said format indication and a second code word corresponding permissible format indication.

21. The computer readable media of claim 20, wherein said function comprises a projection of a first code word representing said format indication onto a Hadamard space, wherein said Hadamard space includes code word vectors representing said plurality of permissible format indications.

22. The computer readable media of claim 19, wherein the frame further includes a format indication corresponding to a first format, wherein said metrics are a function of historical format data.

23. The computer readable media of claim 19, wherein only those permissible formats having a metric within a first range are included in said prioritized order.

24. The computer readable media of claim 19, wherein said decoding comprises partially decoding the data until it can be determined whether said decoding is successful.

25. A wireless communication system comprising:
   a transmitter configured to encode a frame according to a first transmission format, wherein said first transmission format is selected from a plurality of permissible formats; and a receiver configured to:
- receive said frame, wherein said frame includes a received format indication,
- decode said frame according to the transmission format corresponding to said received format indication,
- prioritize said plurality of permissible formats upon encountering a decoding error with said frame, resulting in a prioritized order, and
- decode said frame according to one of more of said plurality of permissible formats in said prioritized order;

wherein said prioritizing comprises:

determining a metric for each of said plurality of permissible formats; and ordering said permissible formats according to said metrics to form said prioritized order;

wherein the frame further includes a format indication corresponding to a first format, wherein a permissible format indication corresponds to each of said plurality of permissible formats, and wherein said metrics are a function of the format indication and the corresponding permissible format indication.

26. The wireless communication system of claim 25, wherein said receiver is further configured to decode said frame according to each of said plurality of permissible formats in said prioritized order until said frame is correctly decoded, or until said permissible formats have been exhausted.

27. The wireless communication system of claim 25, wherein said transmitter is located with a base station, and wherein said receiver is located within a user terminal.

* * * * *